United States Patent
Tanaka

(10) Patent No.: US 11,028,108 B2
(45) Date of Patent: Jun. 8, 2021

(54) METHOD FOR PRODUCING DIALKYLAMINOSILANE

(71) Applicant: JNC CORPORATION, Tokyo (JP)

(72) Inventor: Toru Tanaka, Kumamoto (JP)

(73) Assignee: JNC Corporation, Tokyo (JP)

( * ) Notice: Subject to any disclaimer, the term of this patent is extended or adjusted under 35 U.S.C. 154(b) by 50 days.

(21) Appl. No.: 16/490,890

(22) PCT Filed: Nov. 16, 2017

(86) PCT No.: PCT/JP2017/041325
§ 371 (c)(1),
(2) Date: Sep. 4, 2019

(87) PCT Pub. No.: WO2018/163517
PCT Pub. Date: Sep. 13, 2018

(65) Prior Publication Data
US 2020/0123180 A1   Apr. 23, 2020

(30) Foreign Application Priority Data

Mar. 10, 2017   (JP) .............................. JP2017-045741

(51) Int. Cl.
*C07F 7/10*   (2006.01)
(52) U.S. Cl.
CPC ...................... *C07F 7/10* (2013.01)
(58) Field of Classification Search
None
See application file for complete search history.

(56) References Cited

U.S. PATENT DOCUMENTS 3,467,686 A   9/1969   Creamer

FOREIGN PATENT DOCUMENTS

| JP | 50-005332 | 1/1975 |
| JP | S56-68686 | 6/1981 |
| JP | H04193886 | 7/1992 |
| JP | H08134078 | 5/1996 |
| JP | 2001002682 | 1/2001 |
| JP | 2012136472 | 7/2012 |
| JP | 2015208718 | 11/2015 |
| WO | 2016152226 | 9/2016 |

OTHER PUBLICATIONS

JP-2015208718 machine translation, downloaded Dec. 19, 2020 from Google patents.*
"International Search Report (Form PCT/ISA/210)" of PCT/JP2017/041325, dated Feb. 6, 2018, with English translation thereof, pp. 1-4.
"Search Report of Europe Counterpart Application", dated Jul. 31, 2020, p. 1-p. 7.

* cited by examiner

*Primary Examiner* — Clinton A Brooks
(74) *Attorney, Agent, or Firm* — JCIPRNET

(57) ABSTRACT

A method for safely and efficiently producing high-purity dialkylaminosilane. Dialkylamine is fed simultaneously during feeding chlorosilane in the presence of metal to cause reaction. For example, chlorosilane and dialkylamine are fed, and then only dialkylamine is fed to cause reaction, whereby dialkylaminosilane is produced.

5 Claims, 1 Drawing Sheet

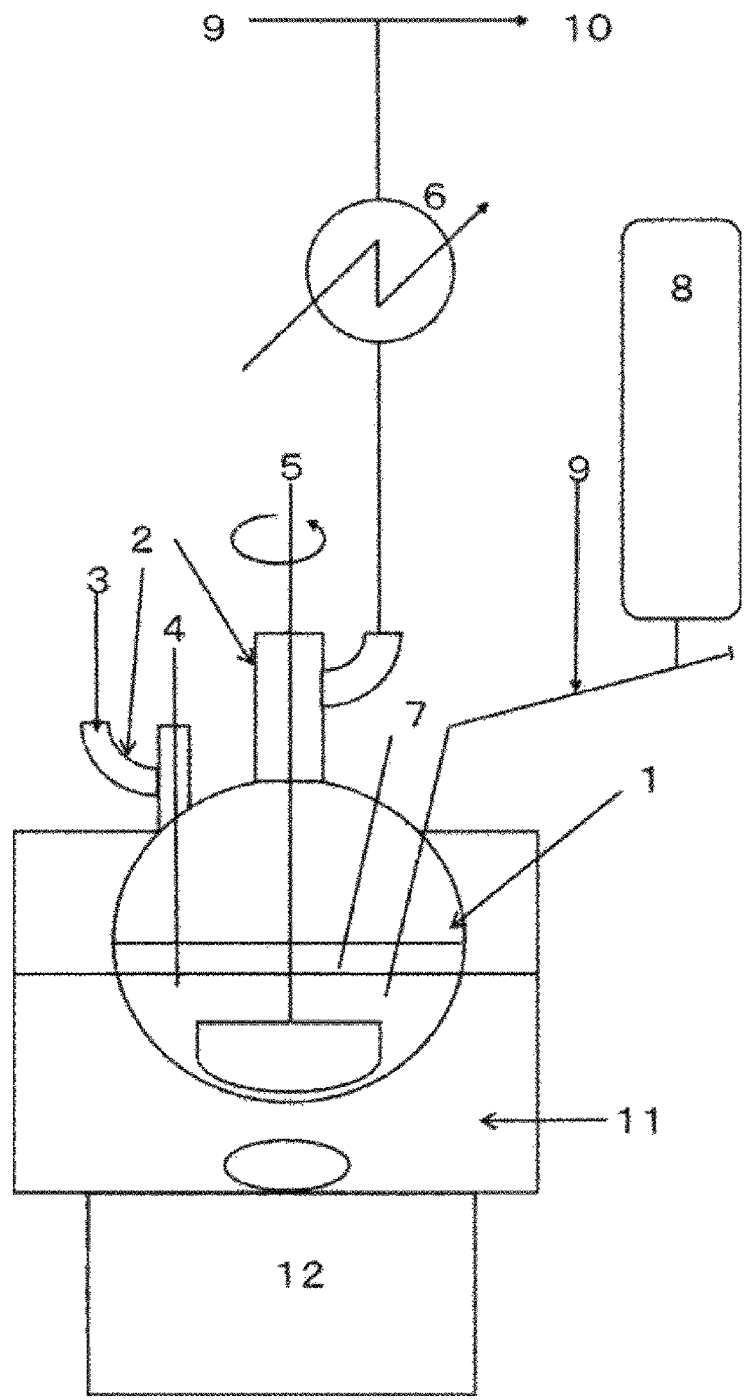

METHOD FOR PRODUCING DIALKYLAMINOSILANE

CROSS-REFERENCE TO RELATED APPLICATION

This application is a 371 application of the international PCT application serial no. PCT/JP2017/041325, filed on Nov. 16, 2017, which claims the priority benefit of Japan application no. 2017-045741, filed on Mar. 10, 2017. The entirety of each of the abovementioned patent applications is hereby incorporated by reference herein and made a part of this specification.

TECHNICAL FIELD

The invention relates to a method for producing highly purified dialkylaminosilane. More specifically, the invention relates to a method for safely and efficiently producing dialkylaminosilane by feeding dialkylamine simultaneously during feeding chlorosilane in the presence of metal.

BACKGROUND ART

Dialkylaminosilane is a compound having a silicon atom and a nitrogen atom in a molecule. In particular, a high-purity product having a low content of highly corrosive halogen including chlorine has been recently desired in an electronics & IT materials area, such as a semiconductor insulating film material and a super-water repellent agent on a silicon wafer surface, and a method for inexpensively and efficiently producing the product has been required.

As a method for producing dialkylaminosilane, the method for synthesizing dialkylaminosilane from a reaction between dialkylamine and chlorosilane is known (Non-patent literature No. 1). However, a large amount of dialkylamine hydrochloride is produced as a by-product, in addition to objective dialkylaminosilane, and therefore in order to obtain dialkylaminosilane, reduction of volumetric efficiency caused by a large amount of a solvent occurs, or solid-liquid separation operation such as filtration or decantation has been required.

Patent literature No. 1 discloses a method for separating dialkylamine hydrochloride produced as a by-product in a large amount, without performing solid-liquid separation such as filtration, by adding an alkaline aqueous solution thereto to dissolve dialkylamine hydrochloride in the alkaline aqueous solution, and extracting the resultant hydrochloride into an aqueous layer.

Patent literature No. 2 discloses a method for allowing dialkylamine hydrochloride produced as a by-product in a large amount to react with metal (such as magnesium), while controlling temperature, into dialkylamine, metal chloride (such as magnesium chloride) and hydrogen to regenerate dialkylamine and to reduce an amount of salt.

Patent literature Nos. 3 and 4 disclose a method for directly producing dialkylaminosilane from metallic silicon and dialkylamine in the presence of a copper catalyst, in which no chlorosilane is used, and therefore no dialkylamine hydrochloride is formed and a halogen content is small.

CITATION LIST

Patent Literature

Patent literature No. 1: JP S50-5332 A.
Patent literature No. 2: U.S. Pat. No. 3,467,686 B.
Patent literature No. 3: JP S56-68686 A.
Patent literature No. 4: JP 2001-2682 A.

Non-Patent Literature

Non-patent literature No. 1: J. Chem. Soc., 1964, 3429-3436.

DISCLOSURE OF INVENTION

Technical Problem

According to the production method in Patent literature No. 1, dialkylaminosilane reactive with water is brought into contact with an alkaline aqueous solution, whereby dialkylaminosilane is liable to be hydrolyzed, resulting in significant reduction of a yield.

According to Patent literature Nos. 3 and 4, structure of dialkylaminosilane is limited into a compound only having a hydrogen group and a dimethylamino group as a substituent, resulting in lack of general versatility.

Moreover, Patent literature No. 2 has a convenience in which dialkylamine hydrochloride formed in the reaction is allowed to react with metal, while controlling temperature, whereby an amount of metal chloride can be reduced, and also dialkylaminosilane can be produced in a substantially stoichiometrically equal amount for dialkylamine. However, if a compound having a great number in substitution of chlorine in chlorosilane is applied, a large load is liable to be applied to solid-liquid separation even for metal chloride. Further, a reaction between dialkylamine hydrochloride and metal does not occur until a mixture reaches a predetermined temperature or higher, and the reaction is accompanied by massive heat generation, and therefore a runaway reaction easily occurs. In particular, both chlorosilane and dialkylamine having a low boiling point are allowed to react with each other at a temperature higher than the boiling points, and therefore a significantly difficult problem has remained on control of the reaction. Therefore, a desire has been expressed for a method of efficiently and safely producing dialkylaminosilane in adapting to various dialkylaminosilanes, and suppressing an amount of accumulation of dialkylamine hydrochloride, and also suppressing a halogen content.

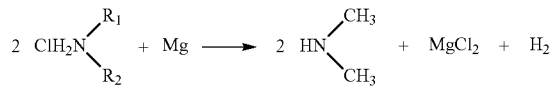

Solution to Problem

The present inventors have found out a method in which a reaction can be moderately performed by examining conditions of feeding dialkylamine and chlorosilane in a process of producing dialkylaminosilane from dialkylamine and chlorosilane.

In order to allow dialkylamine hydrochloride to moderately react with metal, dialkylamine is fed simultaneously with chlorosilane at a predetermined temperature or higher in the presence of metal under conditions in which dialkylamine hydrochloride is not accumulated in a reaction system, whereby dialkylaminosilane has been found to be able to be obtained safely and with a good yield.

The invention is structured of items 1 to 6 described below.

Item 1. A method for producing dialkylaminosilane, wherein dialkylamine is fed simultaneously during feeding chlorosilane in the presence of metal to cause reaction.

Item 2. The method for producing dialkylaminosilane according to item 1, wherein chlorosilane and dialkylamine are fed, and then only dialkylamine is fed to cause reaction.

Item 3. The method for producing dialkylaminosilane according to item 1 or 2, wherein dialkylamine is represented by a chemical formula:

wherein R1 and R2 are independently straight-chain alkyl having 1 to 6 carbons, branched alkyl having 3 to 6 carbons or phenyl.

Item 4. The method for producing dialkylaminosilane according to any one of items 1 to 3, wherein chlorosilane is represented by a chemical formula:

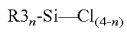

wherein R3 is hydrogen, straight-chain alkyl having 1 to 6 carbons, branched alkyl having 3 to 6 carbons or phenyl, and n is an integer from 0 to 3.

Item 5. The method for producing dialkylaminosilane according to any one of items 1 to 4, wherein the metal to be added is at least one selected from magnesium, calcium and zinc.

Item 6. The method for producing dialkylaminosilane according to any one of items 1 to 5, wherein a temperature of reaction is 70° C. or higher and equal to or lower than a boiling point of a solvent used for the reaction.

Advantageous Effects of Invention

According to the invention, a runaway reaction caused by abrupt heat generation can be prevented by moderately performing a reaction between dialkylamine hydrochloride and metal, and also high-quality dialkylaminosilane having a relatively small halogen content can be produced safely, stably, efficiently and at low cost, irrespective of a kind of chlorosilane. Moreover, if dialkylaminosilane according to the invention is applied, a halogen content in a reaction liquid is small, and therefore a yield in distillation is satisfactory, and high-quality dialkylaminosilane can be efficiently obtained.

BRIEF DESCRIPTION OF DRAWINGS

FIG. 1 shows an apparatus diagram suitable for executing a method for producing dialkylaminosilane according to the invention.

DESCRIPTION OF EMBODIMENTS

A term "chlorosilane" according to the invention is a generic term for monochlorosilane, dichlorosilane, trichlorosilane, tetrachlorosilane and a derivative thereof.

In a process of producing dialkylaminosilane, dialkylamine is fed simultaneously with chlorosilane at a predetermined temperature or higher, whereby dialkylamine hydrochloride has been found to react with metal.

Temperature is preferably 70° C. or higher, or if possible, 80° C. or higher, although a level depends on a solvent. Examples of the method include a method in which dialkylamine is fed simultaneously with chlorosilane in the presence of metal from the start. However when low boiling point dialkylamine, for example, dimethylamine (boiling point: 7° C.) or low boiling point chlorosilane, for example, trichlorosilane (boiling point: 31.8° C.) is allowed to react, as a preparatory step, a small amount of dialkylamine is allowed to react with chlorosilane at a temperature equal to or lower than the boiling point, for example, at 5° C., or a small amount of dialkylaminosilane is added as a seed material.

Next, as a first reaction step, the temperature is increased to feed dialkylamine simultaneously with chlorosilane.

Further, in a second reaction step, chlorosilane or dialkylamine in shortage in the first reaction step is fed to complete the reaction. As a feed balance between chlorosilane and dialkylamine in the first reaction step, if chlorosilane is fed at a little earlier timing to prevent reflux of dialkylamine, a temperature of the reaction is easily maintained.

For example, in the case of a reaction between trichlorosilane and dimethylamine, even if trichlorosilane is fed at a little earlier timing, trichlorosilane reacts with tris(dimethylamino)silane existing in a reaction system into an intermediate product having a relatively high boiling point, namely, (dimethylamino)dichlorosilane (estimated boiling point: 70° C.) and bis (dimethylamino) chlorosilane (estimated boiling point: 107° C.), whereby reflux of trichlorosilane is hard to be caused. On the other hand, if dimethylamine is put therein excessively at earlier timing, dimethylamine is refluxed, and therefore a state unable to maintain the reaction temperature is easily caused.

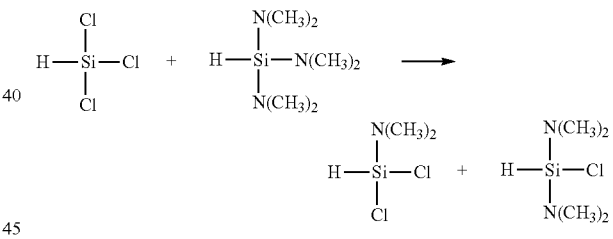

Specific examples of the solvent dissolving dialkylamine hydrochloride and metal chloride include, as an aprotic and high-polar solvent, acetonitrile, tetrahydrofuran (THF), 1,2-dimethoxyethane (DME), dimethylformamide (DMF), acetone, dichloromethane, dimethyl sulfoxide (DMSO), dioxane, dimethylacetamide and hexamethylphosphoramide (HMPA). In addition thereto, ethers such as dibutyl ether, halogen-based hydrocarbon such as chloroform, esters such as ethyl acetate and methyl formate, tertiary amine such as triethylamine and tetramethylethylenediamine, or the like can be used.

Moreover, specific examples of the solvent reducing a halogen content in dialkylaminosilane include straight-chain or branched hydrocarbon such as n-hexane, n-heptane and n-octane.

As the aprotic polar solvent, and the solvent of straight-chain or branched hydrocarbon, a single solvent being the straight-chain or branched hydrocarbon may be used, or the art includes causing reaction between dialkylamine and chlorosilane in a mixed solvent of the straight-chain or branched hydrocarbon, and the aprotic polar solvent. Moreover, the aprotic polar solvent can also be fed by being mixed with chlorosilane, resulting in an effect of preventing blocking of a feed line by dialkylamine hydrochloride at the time.

In the case of the single solvent of the straight-chain or branched hydrocarbon, the aprotic polar solvent is added thereto after the reaction, whereby dialkylamine hydrochloride can be completely dissolved in the solvent, depending on the temperature and an amount of addition of the aprotic polar solvent, and a straight-chain or branched hydrocarbon layer including dialkylaminosilane, and an aprotic polar solvent layer including dialkylamine hydrochloride can be obtained by liquid-liquid separation.

Metal such as magnesium is added thereto before the reaction to allow the metal to react therewith at 50° C. or higher, preferably 70° C. or higher, and further preferably 80° C. or higher. Thus, dialkylamine hydrochloride produced as a by-product on the way of the reaction is allowed to react with the metal such as magnesium, and can be converted into metal chloride such as magnesium chloride. An amount of salt in the form of dialkylamine hydrochloride is reduced by half by conversion into metal chloride, whereby the solvent is further reduced, and an amount of use of dialkylamine can be reduced. Moreover, metal chloride such as magnesium chloride has high solubility in the aprotic polar solvent, and can be completely dissolved in the solvent depending on the temperature and an amount of the solvent in a manner similar to dialkylamine hydrochloride.

FIG. 1 is a configuration diagram showing an ordinary experimental apparatus suitable for executing a method for producing dialkylaminosilane according to the invention.

A reaction vessel is assembled by arranging, for a glass flask equipped with four necks, a Dimroth condenser tube, a branch tube, a content sampling tube, an agitator, a thermometer, a feed tank for chlorosilane and a dialkylamine feed port.

Dialkylaminosilane is decomposed with moisture, and therefore the moisture in the solvent and the apparatus significantly affects a yield. As a dehydrating method, in the solvent, the moisture can be reduced by adsorption by a molecular sieve or the like, and in the apparatus, the moisture can be eliminated by azeotropic dehydration by using a solvent azeotroped with water, such as acetonitrile and octane, and refluxing the solvent, and further the moisture can be reduced by allowing the metal such as magnesium to react with water.

In the following, a case of feeding dialkylamine simultaneously with chlorosilane according to the invention will be described. The straight-chain or branched hydrocarbon, and the metal such as magnesium are charged into the four-neck flask, and then the resulting mixture is preferably heated to cause azeotropic dehydration to allow magnesium to react with water, or to perform both thereof to dehydrate the apparatus. The straight-chain or branched hydrocarbon is preferably greater than chlorosilane by 0.2 to 10 times (weight).

Moreover, the metal such as magnesium is preferably equivalent to or greater than chlorine in chlorosilane by 0.5 times. After dehydration, an internal temperature is decreased to room temperature, and chlorosilane and the aprotic polar solvent are charged into the feed tank.

The aprotic polar solvent can be charged into the four-neck flask in the beginning. However, the aprotic polar solvent is mixed with chlorosilane, whereby an effect of preventing blocking of a chlorosilane feed port by salt can be expected during the reaction. The aprotic polar solvent is preferably greater than chlorosilane by 0.2 to 10 times (weight). Examples include a method in which dialkylamine is fed simultaneously with chlorosilane after the temperature is increased to 70° C. or 80° C. as initial conditions of the reaction. However, specific examples include a method in which part of chlorosilane, or 10% or 5% in terms of the whole weight to be charged is charged at low temperature as a preparatory step and allowed to react with dialkylamine to produce dialkylaminosilane, or a method in which a small amount of objective dialkylaminosilane is charged thereinto. Dialkylaminosilane is formed in advance, whereby volatilization loss of low boiling point chlorosilane when the temperature is increased can be suppressed. Moreover, although a small amount of dialkylamine hydrochloride is formed, the reaction can be ended before the runaway reaction occurs in the reaction with the metal. Next, as the first reaction step, dialkylamine is fed simultaneously with chlorosilane when the temperature reaches 70° C., 80° C. or higher. In particular, as the feed port, dialkylamine and chlorosilane can be fed from any of a gas phase portion and a liquid phase portion. However, when delivery pressure of dialkylamine and chlorosilane is small, dialkylamine hydrochloride is liable to be precipitated in a feed line to block the line. In the above case, in consideration of physical properties such as the boiling points of dialkylamine and chlorosilane, dialkylamine and chlorosilane are fed thereinto by being divided into the gas phase portion and the liquid phase portion, whereby blocking by dialkylamine hydrochloride can be lessened.

Moreover, the aprotic polar solvent is mixed with chlorosilane, whereby blocking by dialkylamine hydrochloride can also be lessened. With regard to a feed speed of dialkylamine and chlorosilane, both are preferably put therein at the feed speed to be the same equivalent. However, unless any raw material becomes excessive and refluxed, and the reaction temperature is decreased from a predetermined temperature, the feed speed does not become a major problem. If the reaction temperature is decreased from the predetermined temperature, dialkylamine hydrochloride is accumulated into a significantly dangerous state, and therefore attention is required to the reaction temperature. If the reaction with the metal occurs when a large amount of dialkylamine hydrochloride is accumulated, a large exothermic reaction is caused, and hydrogen and a dialkylamine gas are further formed, whereby particularly when low boiling point dialkylamine or the like is used as dialkylamine, a gas passage of the Dimroth condenser tube is sealed with a liquid of dialkylamine, whereby internal pressure is liable to be raised, and therefore sufficient attention is required. An end point of the reaction can be confirmed by entry of dialkylamine in an amount equivalent to or greater than chlorosilane and ceasing of heat generation.

Dialkylamine hydrochloride or metal chloride such as magnesium chloride is completely dissolved therein, depending on the amount of the solvent and the temperature, into two layers of a straight-chain or branched hydrocarbon solvent layer containing dialkylaminosilane, and the aprotic polar solvent layer containing dialkylamine hydrochloride or metal chloride such as magnesium chloride in a large amount, and the liquids can be separated. Moreover, when the amount of the solvent is small or the temperature is low, dialkylamine hydrochloride or metal chloride such as magnesium chloride precipitates as a solids content, but the aprotic polar solvent having high solubility is added thereto, and therefore salt having good solid-liquid separation performance is formed. The solid-liquid separation is performed and then the liquids are separated, whereby dialkylaminosilane containing the straight-chain or branched hydrocarbon can be obtained.

In dialkylaminosilane containing the straight-chain or branched hydrocarbon obtained by separating the liquids, the halogen content can be suppressed at a low level by a nonpolar effect of the straight-chain or branched hydrocarbon. A reaction raw liquid having a halogen content (chlorine content) of several ppm to several hundreds of ppm is obtained, although a level depends on an amount of the straight-chain or branched hydrocarbon and a kind of dialkylaminosilane. As a dehalogenating (dechlorinating) agent, a methanol solvent of sodium methoxide, metal alkoxide such as potassium tert-butoxide, or an organometallic compound such as butyllithium and methyl Grignard is added thereto to rectify the resulting mixture, whereby high-quality dialkylaminosilane having a low halogen content (chlorine content) can be obtained.

The compound has been prepared according to procedures described below. The prepared compound has been quantitatively determined by gas chromatographic analysis.

Gas chromatographic analysis: For measurement, GC-2014 Gas Chromatograph made by Shimadzu Corporation has been used. As a column, a packed column having an internal diameter of 2.6 millimeters and length of 3 meters, and as a packing material, SE-30 10% 60/80 Shimalite WAW has been used. As carrier gas, helium (20 mL/minute) was used. A temperature of a sample vaporizing chamber and a temperature of a detector (TCD) part have been set to 250° C. and 250° C., respectively. A sample has been filtered by a syringe filter of 0.5 micrometer, and then 1 microliter of filtrate has been injected into the sample vaporizing chamber. As a recorder, GC Solution System made by Shimadzu Corporation or the like has been used.

Spectrum Data

NMR analysis: For measurement, ECZ400S made by JEOL Ltd. has been used. In $^1$H-NMR measurement, a sample has been dissolved in a deuterated solvent such as CDCl$_3$, and measurement has been carried out under conditions of room temperature, 400 MHz and 8 times of accumulation. Chloroform has been used as an internal standard. In $^{13}$C-NMR measurement, CDCl$_3$ has been used as an internal standard, and measurement has been carried out under conditions of 512 times of accumulation. In explaining nuclear magnetic resonance spectra obtained, s stands for a singlet.

For example, spectrum data of tris(dimethylamino)silane as one of objects is shown.

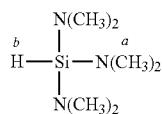

| Chemical shift: δ (ppm) | | |
|---|---|---|
| | $^1$H-MR | $^{13}$C-NMR |
| a | 2.43 (18H, s) | 36.73 |
| b | 4.12 (1H, s) | — |

EXAMPLES

Hereinafter, the invention will be described more specifically by describing Examples and Comparative Examples, but the invention is not limited thereto.

Example 1

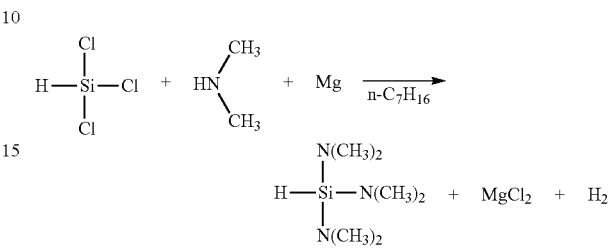

Preparatory Step

Into a 300 mL four-neck flask, 7.66 g (0.32 mol) of magnesium and 90 g of n-heptane were charged. An oil bath was heated to 115° C., while stirring the resulting mixture, into a reflux state for 1 hour, and moisture in a solvent and an apparatus was allowed to react with magnesium to dehydrate the solvent and the apparatus, and then the oil bath was removed, and the resulting content was cooled with ice water. Into a 50 mL feed tank, 40.8 g (30 mL, 0.30 mol) of trichlorosilane (TCS) was charged, and when an internal temperature was decreased to 5° C., 3 mL of TCS was charged into the 300 mL four-neck flask. In a state in which the temperature was maintained at 10° C. or lower, dimethylamine (DMA) was fed from a gas phase part of the flask thereinto at a rate of 16 mL per minute for 1 hour.

First Reaction Step

The cooling with ice water was stopped, the 300 mL four-neck flask was again immersed into the oil bath, a temperature of oil was set to 90° C., and the oil bath was heated until a temperature of a reaction liquid reached 80° C. or higher. On the way of the heating, a reaction between DMA hydrochloride and magnesium occurred, but no noticeable rapid increase in temperature was observed. When the internal temperature was over 80° C., TCS was fed into the liquid at a rate of 13.5 mL per hour, and simultaneously feed of DMA to a gas phase was started at a rate of 85 mL per minute. A time of simultaneous feed of DMA was 2 hours, and a gas chromatography (GC) analysis of the reaction liquid at completion of the simultaneous feed of DMA resulted in 1.9% of TCS, 85.2% of n-heptane and (dimethylamino)dichlorosilane (1D form) and 12.9% of bis(dimethylamino)chlorosilane (2D form). In addition, in n-heptane and the 1D form, peaks were overlapped in GC and treated as one peak.

Second Reaction Step

Further, DMA was fed for 2 hours and 30 minutes. Then, 69.5 g (1.54 mol) of DMA in total by adding feed portions of two times for DMA was fed. When reduction of the temperature of the reaction liquid and loss of the 2D form of an intermediate product by the GC analysis were confirmed, feed of DMA was stopped. Heating of the oil bath was stopped. After cooling, 208 g of the reaction liquid was obtained.

Posttreatment Step

The reaction liquid was filtered by a pressure filter to which a qualitative filter 2C was attached, and a residue was washed with 30 g of n-heptane to obtain 147 g of a filtrate containing tris(dimethylamino)silane (TDMAS). When the GC analysis was conducted, 43.5 g (0.27 mol) of TDMAS was contained therein and a reaction yield was 90%. Further, when hydrolyzable chlorine was measured, a content was 188 ppm.

Example 2

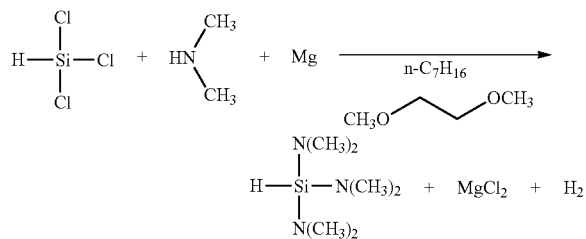

Preparatory Step

Into a 300 mL four-neck flask, 7.64 g (0.31 mol) of magnesium, 60 g of n-heptane and 30 g of 1,2-dimethoxyethane (DME) were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into a 50 mL feed tank, 45.0 g (32 mL, 0.33 mol) of TCS was charged, and when an internal temperature was decreased to 5° C., 3 mL of TCS was charged into the 300 mL four-neck flask. In a state in which the temperature was maintained at 10° C. or lower, DMA was fed from a gas phase part of the flask thereinto at a rate of 37 mL per minute for 1 hour.

First Reaction Step

The oil bath was set to 90° C., and heated until a temperature of a reaction liquid reached 80° C. or higher. On the way of the heating, a reaction between DMA hydrochloride and magnesium occurred, but no noticeable rapid increase in temperature was observed. When the internal temperature was more than 80° C., TCS was added dropwise into the liquid at a rate of 14.5 mL per hour, and simultaneously feed of DMA to a gas phase was started at a rate of 85 mL per minute. A time of the simultaneous feed of DMA was 2 hours, and a GC analysis of the reaction liquid at completion of the simultaneous feed resulted in 3.2% of TCS, 25.2% of DME, 64.0% of n-heptane and a 1D form and 7.7% of a 2D form.

Second Reaction Step

Further, DMA was fed for 2 hours and 30 minutes. Then, 61.2 g (1.36 mol) of DMA in total was fed. When reduction of the temperature of the reaction liquid and loss of the 2D form of an intermediate product by a GC analysis were confirmed, feed of DMA was stopped. After cooling, 204 g of the reaction liquid was obtained.

Posttreatment Step

The reaction liquid was filtered by a pressure filter, and a residue was washed with 30 g of n-heptane to obtain 133 g of a filtrate containing TDMAS. When the GC analysis was conducted, 45.7 g (0.28 mol) of TDMAS was contained therein and a reaction yield was 85%. Further, when hydrolyzable chlorine was measured, a content was 183 ppm.

Example 3

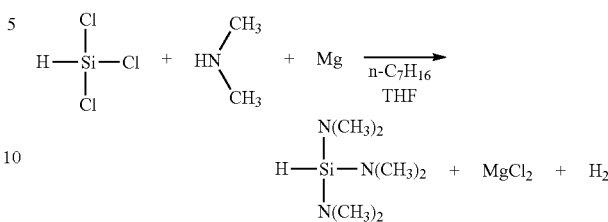

Preparatory Step

Into a 300 mL four-neck flask, 5.10 g (0.21 mol) of magnesium, 60 g of n-heptane and 15 g of THF were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into a 50 mL feed tank, 28.0 g (20 mL, 0.21 mol) of TCS was charged, and when an internal temperature was decreased to 5° C., 3 mL of TCS was charged into the 300 mL four-neck flask. In a state in which the temperature was maintained at 10° C. or lower, DMA was fed from a gas phase part of the flask thereinto at a rate of 16 mL per minute for 1 hour.

First Reaction Step

The oil bath was set to 90° C., and heated until a temperature of a reaction liquid reached 80° C. or higher. On the way of the heating, a reaction between DMA hydrochloride and magnesium occurred, but no noticeable rapid increase in temperature was observed. When the internal temperature was more than 80° C., TCS was added dropwise into the liquid at a rate of 11.3 mL per hour, and simultaneously feed of DMA to a gas phase was started at a rate of 85 mL per minute. A time of simultaneous feed of DMA was 1 hour and 30 minutes, and a GC analysis of the reaction liquid at completion of the simultaneous feed resulted in 2.5% of TCS, 12.6% of THF, 75.1% of n-heptane and a 1D form and 9.8% of a 2D form.

Second Reaction Step

Further, DMA was fed for 1 hour and 30 minutes. Then, 41.0 g (0.91 mol) of DMA in total was fed. When reduction of the temperature of the reaction liquid and loss of the 2D form of an intermediate product by the GC analysis were confirmed, feed of DMA was stopped. After cooling, 150 g of the reaction liquid was obtained.

Posttreatment Step

The reaction liquid was filtered by a pressure filter, and a residue was washed with 30 g of n-heptane to obtain 108 g of a filtrate containing TDMAS. When the GC analysis was conducted, 29.3 g (0.18 mol) of TDMAS was contained therein and a reaction yield was 88%. Further, when hydrolyzable chlorine was measured, a content was 450 ppm.

Example 4

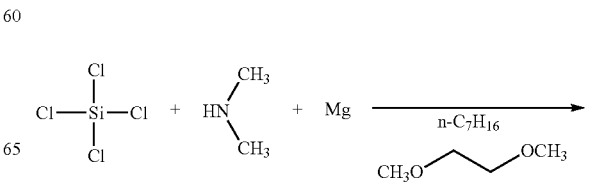

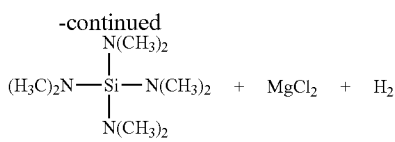

Preparatory Step

Into a 300 mL four-neck flask, 6.80 g (0.28 mol) of magnesium, 60 g of n-heptane and 30 g of DME were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into a 50 mL feed tank, 34.0 g (23 mL, 0.20 mol) of tetrachlorosilane (4CS) was charged, and when an internal temperature was decreased to 5° C., 3 mL of 4CS was charged into the 300 mL four-neck flask. In a state in which the temperature was maintained at 10° C. or lower, DMA was fed from a gas phase part of the flask thereinto at a rate of 16 mL per minute for 1 hour.

First Reaction Step

The oil bath was set to 90° C., and heated until a temperature of a reaction liquid reached 80° C. or higher. On the way of the heating, a reaction between DMA hydrochloride and magnesium occurred, but no noticeable rapid increase in temperature was observed. When the internal temperature was more than 80° C., 4CS was added dropwise into the liquid at a rate of 11.5 mL per hour, and simultaneously feed of DMA to a gas phase was started at a rate of 85 mL per minute. A time of simultaneous feed of DMA was 2 hours, and a GC analysis of the reaction liquid at completion of the simultaneous feed resulted in 1.5% of 4CS, 15.8% of DME, 57.1% of n-heptane, 6.3% of (dimethylamino)trichlorosilane, 14.5% of bis(dimethylamino)dichlorosilane and 4.8% of tris(dimethylamino)chlorosilane.

Second Reaction Step

Further, DMA was fed for 2 hours. Then, 50.9 g (1.13 mol) of DMA in total was fed. When reduction of the temperature of the reaction liquid and loss of tris (dimethylamino) chlorosilane of an intermediate product by the GC analysis were confirmed, feed of DMA was stopped. After cooling, 181 g of the reaction liquid was obtained.

Posttreatment Step

The reaction liquid was filtered by a pressure filter, and a residue was washed with 30 g of n-heptane to obtain 135 g of a filtrate containing tetrakis(dimethylamino)silane (4DMAS). When the GC analysis was conducted, 33.9 g (0.17 mol) of 4DMAS was contained therein and a reaction yield was 83%. Further, when hydrolyzable chlorine was measured, a content was 140 ppm.

Example 5

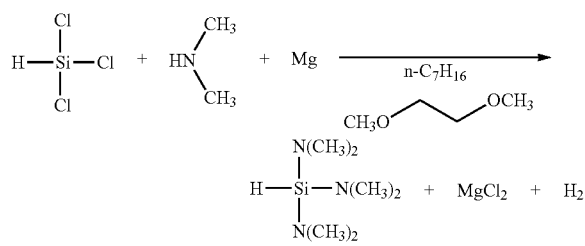

Preparatory Step

Into a 300 mL four-neck flask, 7.64 g (0.31 mol) of magnesium, 60 g of n-heptane and 50 g of DME were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into a 50 mL feed tank, 40.6 g (30 mL, 0.30 mol) of TCS was charged, and when an internal temperature was decreased to 5° C., 3 mL of TCS was charged into the 300 mL four-neck flask. In a state in which the temperature was maintained at 10° C. or lower, DMA was fed from a gas phase part of the flask thereinto at a rate of 16 mL per minute for 1 hour.

First Reaction Step

The oil bath was set to 80° C., and heated until a temperature of a reaction liquid reached 75° C. On the way of the heating, a reaction between DMA hydrochloride and magnesium occurred, but no noticeable rapid increase in temperature was observed. When the internal temperature was maintained at 75° C., TCS was added dropwise into the liquid at a rate of 13.5 mL per hour, and simultaneously feed of DMA to a gas phase was started at a rate of 85 mL per minute. A time of simultaneous feed of DMA was 2 hours, and a GC analysis of the reaction liquid at completion of the simultaneous feed resulted in 2.0% of TCS, 33.9% of DME, 49.4% of n-heptane and a 1D form and 14.7% of a 2D form.

Second Reaction Step

Further, DMA was fed for 2 hours and 30 minutes. Then, 65.3 g (1.45 mol) of DMA in total was fed. On the way, after 1 hour from completion of feed of TCS, an internal temperature was confirmed to be temporarily increased from 75° C. to 83° C. When reduction of the temperature of the reaction liquid and loss of the 2D form of an intermediate product by GC were confirmed, feed of DMA was stopped. After cooling, 224 g of the reaction liquid was obtained.

Posttreatment Step

The reaction liquid was filtered by a pressure filter, and a residue was washed with 30 g of n-heptane to obtain 157 g of a filtrate containing TDMAS. When the GC analysis was conducted, 45.0 g (0.28 mol) of TDMAS was contained therein and a reaction yield was 93%. Further, when hydrolyzable chlorine was measured, a content was 138 ppm.

Example 6

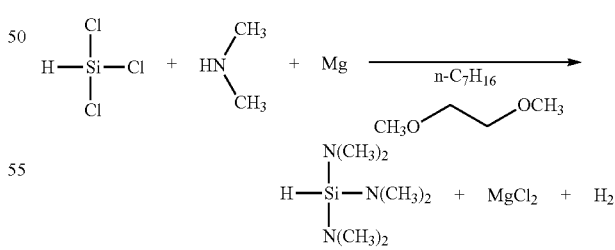

Preparatory Step

Into a 3 L four-neck flask, 87.5 g (3.6 mol) of magnesium and 750 g of n-heptane were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into a 500 mL feed tank, a mixture (468 mL) of 408 g (3.01 mol) of TCS and 150 g of DME was charged, and when an internal temperature was decreased to 5° C., 30 mL of a mixture of TCS and DME was charged into the 3 L four-neck flask. In a state in which the temperature was maintained at 10° C. or lower, DMA was fed from a gas phase part of the flask thereinto at a rate of 240 mL per minute for 1 hour.

First Reaction Step

The oil bath was set to 90° C., and heated until a temperature of a reaction liquid reached 85° C. On the way of the heating, a reaction between DMA hydrochloride and magnesium occurred, but no noticeable rapid increase in temperature was observed. When an internal temperature was maintained at 85° C., TCS was added dropwise into the liquid at a rate of 55 mL per hour, and simultaneously feed of DMA to a gas phase was started at a rate of 420 mL per minute. A time of simultaneous feed of DMA was 8 hours, and a GC analysis of the reaction liquid at completion of the simultaneous feed resulted in 9.3% of DME, 63.0% of n-heptane and a 1D form, 14.8% of a 2D form and 12.9% of TDMAS.

Second Reaction Step

Further, DMA was fed for 2 hours and 30 minutes. Then, 555 g (12.3 mol) of DMA in total was fed. When reduction of the temperature of the reaction liquid and loss of the 2D form of an intermediate product by the GC analysis were confirmed, feed of DMA was stopped. After cooling, 1950 g of the reaction liquid was obtained.

Posttreatment Step

The reaction liquid was filtered by a pressure filter, and a residue was washed with 300 g of n-heptane to obtain 1434 g of a filtrate containing TDMAS. When the GC analysis was conducted, 464 g (2.87 mol) of TDMAS was contained therein and a reaction yield was 95%. Further, when hydrolyzable chlorine was measured, a content was 40 ppm.

Rectification Step

A liquid obtained by adding, as a dehalogenating (dechlorinating) agent, 360 mg (3.2 mmol) of potassium tert-butoxide, twice as many as moles of a chlorine content, to the filtrate was charged into a 2 L four-neck flask, and a device prepared by packing HELI PACK as a packing material into a column having a diameter of 2.5 cm and a length of 30 cm was used as a rectifying column under decompressed conditions of a pressure from 30 kPa to 21 kPa to perform rectification. As conditions of cutting a main distillate fraction, pressure was 22 kPa, and as temperature, an oil temperature of the oil bath was in the range of 124° C. to 133° C., a temperature inside the flask was in the range of 96° C. to 100° C., and an overhead temperature was 80° C. to obtain 325 g of TDMAS having a purity of 99% or more and a hydrolyzable chlorine content less than 1 ppm with a distillation yield of 70%.

Comparative Example 1

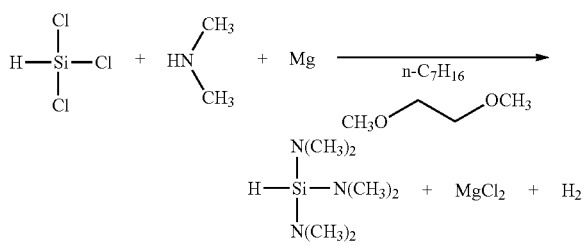

Preparatory Step

Into a 300 mL four-neck flask, 7.60 g (0.31 mol) of magnesium, 60 g of n-heptane and 23 g of DME were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into the 300 mL four-neck flask, 40.8 g (0.30 mol) of TCS was charged, and when an internal temperature was decreased to 5° C., DMA was fed from a gas phase part of the flask thereinto at a rate of 85 mL per minute for 2 hours.

Reaction Step

The oil bath was set to 90° C., and heated until a temperature of a reaction liquid reached 80° C. or higher. On the way of the heating, a reaction between DMA hydrochloride and magnesium occurred, a rapid increase in temperature was caused, and a temperature inside the flask was raised to 90° C. However, reflux of the solvent was not observed. When the internal temperature was more than 80° C., feed of DMA was started at a rate of 85 mL per minute. A phenomenon in which reflux was intensified in the flask was observed after 15 minutes from restart of feed of DMA, and the temperature inside the flask was raised to 92° C. DMA was fed for 3 hours, and 65.9 g (1.46 mol) of DMA in total was fed. When reduction of the temperature of the reaction liquid and loss of a 2D form of an intermediate product by a GC analysis were confirmed, feed of DMA was stopped. After cooling, 197 g of the reaction liquid was obtained.

Posttreatment Step

The reaction liquid was filtered by a pressure filter, and a residue was washed with 31 g of n-heptane to obtain 109 g of a filtrate containing TDMAS. When the GC analysis was conducted, 25.9 g (0.16 mol) of TDMAS was contained therein and a reaction yield was 53%. Further, when hydrolyzable chlorine was measured, a content was 620 ppm.

Comparative Example 2

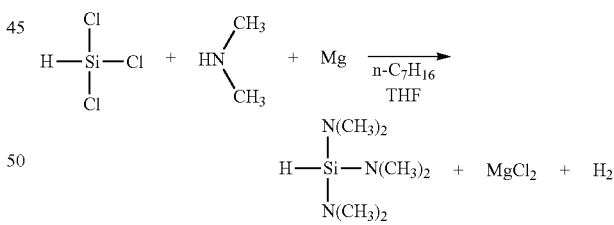

Preparatory Step

Into a 300 mL four-neck flask, 5.10 g (0.21 mol) of magnesium and 60 g of n-heptane were charged. An oil bath was heated to 115° C., while stirring the resulting mixture, into a reflux state for 1 hour, and moisture in a solvent and an apparatus was allowed to react with magnesium to dehydrate the solvent and the apparatus, and then the resulting content was cooled with ice water. Into the 300 mL four-neck flask, 27.9 g (0.21 mol) of TCS was charged, and when an internal temperature was decreased to 5° C., DMA was fed from a gas phase part of the flask thereinto at a rate of 85 mL per minute for 3 hours 30 minutes, and feed of DMA was stopped.

Reaction Step

Next, when the oil bath was set to 60° C., and heated until a temperature of a reaction liquid reached 50° C. or higher, 15 g of THF was taken into a syringe and slowly added to the 300 mL four-neck flask. On the way of addition of THF, a reaction between DMA hydrochloride and magnesium was not observed. Setting of the temperature of the oil bath was increased to 80° C., and when the temperature inside the flask was more than 75° C., a rapid increase in temperature was caused, the internal temperature was raised to 89° C., and simultaneously a content was bubbled and refluxed.

When loss of a 2D form of an intermediate product was confirmed by a GC analysis, the resulting content was cooled. Then, 40.1 g (0.89 mol) of DMA was fed. After cooling, 148 g of the reaction liquid was obtained.

Posttreatment Step

The reaction liquid was filtered by a pressure filter, and a residue was washed with 30 g of n-heptane to obtain 103 g of a filtrate containing TDMAS. When the GC analysis was conducted, 20.3 g (0.13 mol) of TDMAS was contained therein and a reaction yield was 61%. Further, when hydrolyzable chlorine was measured, a content was 490 ppm.

TABLE 1

(Reaction conditions)

|  |  | Example 1 | Example 2 | Example 3 | Example 4 | Example 5 | Example 6 | Comparative Example 1 | Comparative Example 2 |
|---|---|---|---|---|---|---|---|---|---|
| Solvent 1 |  | n-Heptane | n-Heptane | n-Heptane | n-Heptane | n-Heptane | n-Heptane | n-Heptane | n-Heptane |
| Weight of solvent 1 | g | 90 | 60 | 60 | 60 | 60 | 750 | 60 | 60 |
| Solvent 2 |  | — | DME | THF | DME | DME | DME | DME | THF |
| Weight of solvent 2 | g | — | 30 | 15 | 30 | 50 | 150 | 23 | 15 |
| TCS | g | 40.8 | 45.0 | 28.0 |  | 40.6 | 408 | 40.8 | 27.9 |
|  | mol | 0.30 | 0.33 | 0.21 |  | 0.30 | 3.01 | 0.30 | 0.21 |
| 4CS | g |  |  |  | 34.0 |  |  |  |  |
|  | mol |  |  |  | 0.20 |  |  |  |  |
| DMA | g | 69.5 | 61.2 | 41.0 | 50.9 | 65.3 | 555 | 65.9 | 40.1 |
|  | mol | 1.54 | 1.36 | 0.91 | 1.13 | 1.45 | 12.3 | 1.46 | 0.89 |
| DMA/TCS | Molar ratio | 5.12 | 4.09 | 4.40 |  | 4.84 | 4.09 | 4.86 | 4.32 |
| DMA/4CS | Molar ratio |  |  |  | 5.65 |  |  |  |  |
| Mg | g | 7.66 | 7.64 | 5.10 | 6.80 | 7.64 | 87.5 | 7.60 | 5.10 |
|  | mol | 0.32 | 0.31 | 0.21 | 0.28 | 0.31 | 3.6 | 0.31 | 0.21 |
| TCS/DMA feed method |  | Simultaneous feed | Simultaneous feed | Simultaneous feed | Simultaneous feed | Simultaneous feed | Simultaneous feed | TCS filled DMA feed | TCS filled DMA feed |
| Reaction temperature | ° C. | 5-85 | 5-85 | 5-85 | 5-85 | 5-75 | 5-85 | 5-92 | 5-89 |

TABLE 2

(Yield and the like)

|  |  |  | Example 1 | Example 2 | Example 3 | Example 4 | Example 5 | Example 6 | Comparative Example 1 | Comparative Example 2 |
|---|---|---|---|---|---|---|---|---|---|---|
| Feed time | TCS | Minute | 120 | 120 | 90 | 160 | 120 | 480 |  |  |
|  | DMA | Minute | 330 | 390 | 210 | 360 | 270 | 690 | 305 | 210 |
| Reaction liquid |  | g | 208 | 204 | 150 | 181 | 224 | 1950 | 197 | 148 |
| Filtrate |  | g | 147 | 133 | 108 | 135 | 157 | 1434 | 109 | 103 |
| Rinse |  | g | 30 | 30 | 30 | 30 | 30 | 300 | 31 | 30 |
| Yield (GC) |  | g | 43.5 | 45.7 | 29.3 | 33.9 | 45.0 | 464 | 25.9 | 20.3 |
| Yield |  | % | 90 | 85 | 88 | 83 | 93 | 95 | 53 | 61 |
| Cl content |  | ppm | 188 | 183 | 450 | 140 | 138 | 40 | 620 | 490 |

As is obvious from Table 1 and Table 2, comparison of Examples 1 to 6 with Comparative Examples 1 and 2 shows that, while abnormal heat generation in which the reaction temperature was higher than a set temperature was observed, and the yield was as low as about 60% in Comparative Examples, no abnormal exothermic reaction was observed, and tris(dimethylamino)silane or tetrakis(dimethylamino)silane was confirmed to be able to be produced with a high yield of about 90% by simultaneously feeding dimethylamine under heating of trichlorosilane or tetrachlorosilane in Examples.

REFERENCE SIGNS LIST

1 Four-neck flask
2 Branch tube
3 DMA feed port
4 Sampling tube
5 Agitator
6 Condenser tube
7 Thermometer
8 Feed tank for chlorosilane
9 Nitrogen feed port
10 Exhaust
11 Oil bath
12 Magnetic stirrer

What is claimed is:

1. A method for producing dialkylaminosilane, wherein dialkylamine is fed simultaneously during feeding chlorosilane in the presence of metal to cause reaction in a batch reactor wherein the metal to be added is magnesium.

2. The method for producing dialkylaminosilane according to claim 1, wherein chlorosilane and dialkylamine are fed, and then only dialkylamine is fed to cause reaction.

3. The method for producing dialkylaminosilane according to claim 1, wherein dialkylamine is represented by a chemical formula:

wherein R1 and R2 are independently straight-chain alkyl having 1 to 6 carbons, branched alkyl having 3 to 6 carbons or phenyl.

4. The method for producing dialkylaminosilane according to claim 1, wherein chlorosilane is represented by a chemical formula:

$$R3_n-Si-Cl_{(4-n)}$$

wherein R3 is hydrogen, straight-chain alkyl having 1 to 6 carbons, branched alkyl having 3 to 6 carbons or phenyl, and n is an integer from 0 to 3.

5. The method for producing dialkylaminosilane according to claim 1, wherein a temperature of reaction is 70° C. or higher and equal to or lower than a boiling point of a solvent used for the reaction.

* * * * *